(No Model.)
S. NIKOLOFF.
RAIL BOND FOR ELECTRIC RAILWAYS.
No. 554,949. Patented Feb. 18, 1896.
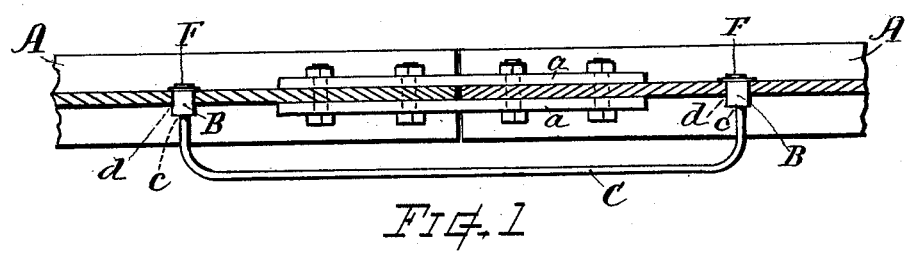
Fig. 1
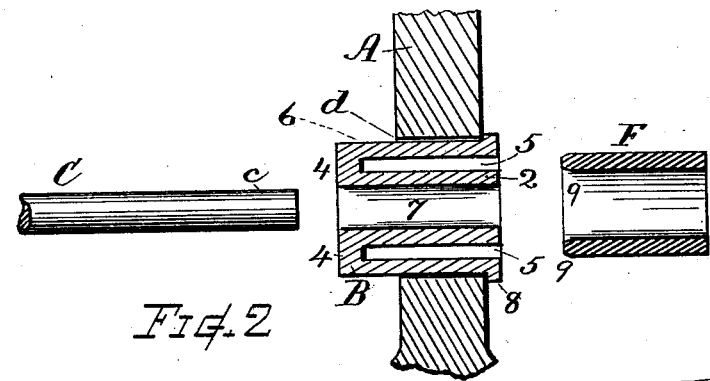
Fig. 2
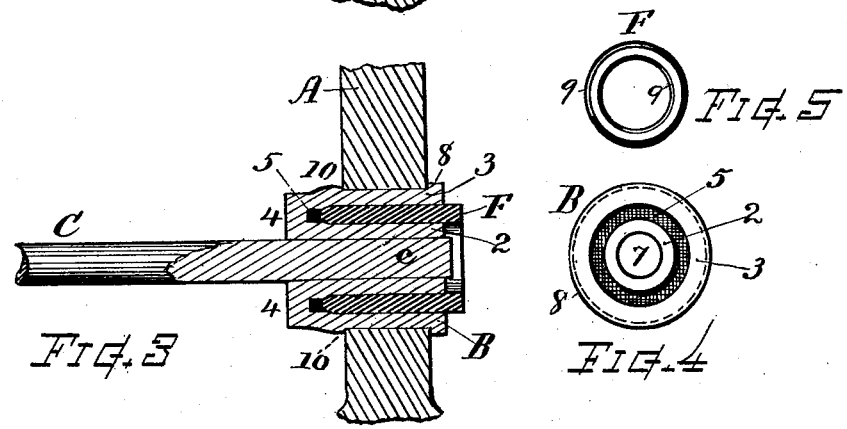
Fig. 3
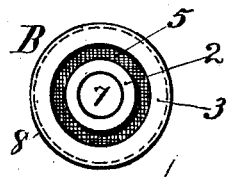
Fig. 5
Fig. 4
Witnesses.
J. R. Barton
Simon E. King
Inventor.
Srbbo Nikoloff
By Chas. H. Burleigh
Attorney

UNITED STATES PATENT OFFICE.

SUBBO NIKOLOFF, OF WORCESTER, MASSACHUSETTS.

RAIL-BOND FOR ELECTRIC RAILWAYS.

SPECIFICATION forming part of Letters Patent No. 554,949, dated February 18, 1896.

Application filed January 2, 1896. Serial No. 574,047. (No model.)

*To all whom it may concern:*

Be it known that I, SUBBO NIKOLOFF, a subject of the Kingdom of Bulgaria, residing at Worcester, in the county of Worcester and State of Massachusetts, have invented a new and useful Rail-Bond for Electric Railways, of which the following, together with the accompanying drawings, is a specification sufficiently full, clear, and exact to enable persons skilled in the art to which this invention appertains to make and use the same.

This invention relates to an improved method and means for attaching the bond wire or rod to the track-rails, the object being to provide a bond comparatively inexpensive for manufacture, and which can be applied to use with great ease and accuracy; also, to provide a bond that will afford a more perfect electrical connection, offering less resistance and avoiding leakage of current; one which will be permanent and durable and will not work loose by the jar of the rails. These objects I attain by a bond having the peculiar construction and manner of affixment herein described, and illustrated in the drawings, wherein—

Figure 1 is a horizontal view of my improved rail-bond. Fig. 2 is a sectional view showing the parts before assembling. Fig. 3 is a sectional view showing the complete bond in its final connection. Fig. 4 is an end view of the attaching plug or bushing, and Fig. 5 is a view of the entering end of the tubular key or expander.

Referring to parts, A indicates the rails joined in usual manner by the fish-plates *a* and bolts passing through the same. Each rail is provided with the usual hole *d* through its web for the reception of the bond devices.

B indicates my improved attaching plug or bushing, which consists of a round piece, preferably of copper, formed with an inner cylindrical portion, 2, and an outer cylindrical portion, 3, with an annular space 5 between the two cylindrical parts, which are joined together, closing the space at one end, as at 4. The exterior 6 of the outer cylindrical portion is formed of a dimension that will freely enter and fit the hole *d* in the rail, while the inner cylindrical portion has an axial opening 7 that will freely receive and fit the end *c* of the bond wire or rod C, which latter is preferably of copper and is arranged to extend from one rail to another in the manner shown in Fig. 1.

The outer and inner surfaces of the cylindrical portions 3 and 2 and the annular space 5 are concentric and made longitudinally straight and parallel with each other and with the axis. The length of the bushing or plug is made somewhat greater than the thickness of the web of the rail A, and a slight flange or enlargement 8 is best formed on the exterior of the bushing at its open end to prevent its passing completely through the hole in the rail.

F indicates a longitudinally-straight tubular key or expander, formed of steel, and diametrically corresponding to the annular space 5, but with the thickness of its shell somewhat greater than the width of said annular space, the external dimension of the tube F being greater than the internal dimension of the outer cylindrical portion, 3, of the bushing, and the internal dimension of said tube being less than the external dimension of the inner cylindrical portion, 2, of said bushing. This tubular key F is adapted to be forced or driven into the annular space 5, and its entering end is slightly rounded at 9 to avoid cutting the copper surfaces when inserted therein. The tubular keys F can be readily formed by simply cutting sections of proper length from the end of a piece of standard steel tubing and then slightly rounding off the angles at one end, as at 9.

The bond-wire C is used plain, or as simply cut to length from the coil, without requiring any upsetting or other work upon its ends *c*.

The bushing-plugs B and tubular keys F may be manufactured and sold as articles of manufacture separate from the wire C, if in any instance desired, the same to be put together when attaching the bonds to the rails.

When applying the bond to use, the parts are assembled by first introducing the plug or bushing B into the hole *d* in the rail A, then inserting the plain end *c* of the bond-wire C into the central opening 7. The tubular key F is then driven into the annular space 5 by means of a hammer or other suitable implement. Said key acts to expand the outer cylindrical portion, 3, causing it to solidly and perfectly fill the hole $d$ in the rail and to bulge outward at the inner end past the angle of the opening, as at 10, (see Fig. 3,) making, together with the swell 8, a complete lock, that prevents the loosening or escape of the attachment by jar of the rails, and forming a stop that excludes moisture from entering the joint. At the same time the tubular key also compresses the inner cylindrical portion, 2, upon the end $c$ of the bond-wires, condensing the metal and practically welding their surfaces together in a cohesive union, which, with the solid connection at 4, affords perfect conductivity for the electric current without offering material resistance or causing leakage of the current.

The cylindrical surfaces all being straight and parallel, the parts can be easily and inexpensively manufactured, while bond-wire can be used plain, or as cut from the coil, a matter of great practical utility.

The bonds can be quickly applied to the rails without special care on the part of the workmen, and a certain, efficient, and durable electrical connection is insured.

What I claim, and desire to secure by Letters Patent, is—

1. The attaching device or plug for electric rail-bonds, comprising an outer cylinder joined at one end with an inner cylinder axially concentric and parallel therewith, and having an annular intervening space for the reception of a tubular key or expander, for the purpose set forth.

2. A rail-bond for electric railways consisting of a plain rod or wire, its ends respectively secured within the holes in the rails by a bushing or plug composed of an outer cylinder externally fitting within the hole through the rail, and an inner cylinder internally fitting over the plain end of said bond-wire, and provided with an annular space between said outer and inner cylinders, and the tubular drive-key having a straight body of greater thickness than the normal dimension of said annular space, said key driven into said space, expanding the outer cylinder and simultaneously compressing the inner cylinder, in the manner set forth.

3. An electric rail attachment, comprising a bushing or plug externally fitting the hole in the rail and internally fitting upon the bond-wire, and having an annular space formed therein longitudinally parallel with the axis and cylindrical surfaces, and extending through and beyond the thickness of the rail, in combination with a straight tubular drive-key of greater thickness than the annular space, adapted to be driven endwise into said annular space past the web of the rail to expand the body and projecting portion of the bushing within and beyond the hole in the rail, and to compress the inner portion upon the bond-wire, as set forth.

Witness my hand this 30th day of December, 1895.

SUBBO NIKOLOFF.

Witnesses:
CHAS. H. BURLEIGH,
H. M. CALDWELL.